United States Patent
Berretty

(10) Patent No.: US 9,532,038 B2
(45) Date of Patent: Dec. 27, 2016

(54) RENDERING OF IMAGE DATA FOR MULTI-VIEW DISPLAY

(75) Inventor: Robert-Paul Mario Berretty, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1815 days.

(21) Appl. No.: 12/091,944

(22) PCT Filed: Oct. 31, 2006

(86) PCT No.: PCT/IB2006/054025
§ 371 (c)(1),
(2), (4) Date: Apr. 29, 2008

(87) PCT Pub. No.: WO2007/052216
PCT Pub. Date: May 10, 2007

(65) Prior Publication Data
US 2008/0291268 A1    Nov. 27, 2008

(30) Foreign Application Priority Data

Nov. 4, 2005 (EP) ..................... 05110369

(51) Int. Cl.
*H04N 13/04* (2006.01)
*H04N 13/00* (2006.01)

(52) U.S. Cl.
CPC ...... *H04N 13/0447* (2013.01); *H04N 13/0011* (2013.01); *H04N 13/0018* (2013.01)

(58) Field of Classification Search
USPC .......................................................... 348/51
See application file for complete search history.

(56) References Cited

U.S. PATENT DOCUMENTS 3,612,658 A * 10/1971 Slaymaker .................... 359/559
4,698,816 A * 10/1987 Chun .............................. 372/19
(Continued)

FOREIGN PATENT DOCUMENTS

| EP | 1143747 A2 | 10/2001 |
|---|---|---|
| EP | 1460857 A1 | 9/2004 |

(Continued)

OTHER PUBLICATIONS

Konrad et al: "Cancellation of Image Crosstalk in Time-Sequential Displays of Stereoscopic Video"; IEEE Transactions on Image Processing, vol. 9, No. 5, May 2000, pp. 897-908.

(Continued)

*Primary Examiner* — Ario Etienne
*Assistant Examiner* — Blake Rubin

(57) ABSTRACT

The invention pertains to rendering of image data for a multi-view display, such as image data for a lenticular auto-stereoscopic display. The method comprising the steps of providing view-dependent image data for an image, determining a view-dependent intensity function, or luminance function, for the image, applying a spatial filtering to a view-dependent coordinate of the intensity function, the spatial filtering being such as a low-pass filter, a high-pass filter or a combination of a low-pass and a high-pass filter, and sampling the view-dependent intensity function to a plurality of sub-images, each sub-image being associated with a view-direction of the image.

15 Claims, 3 Drawing Sheets

(56) References Cited

U.S. PATENT DOCUMENTS

Figure 1:
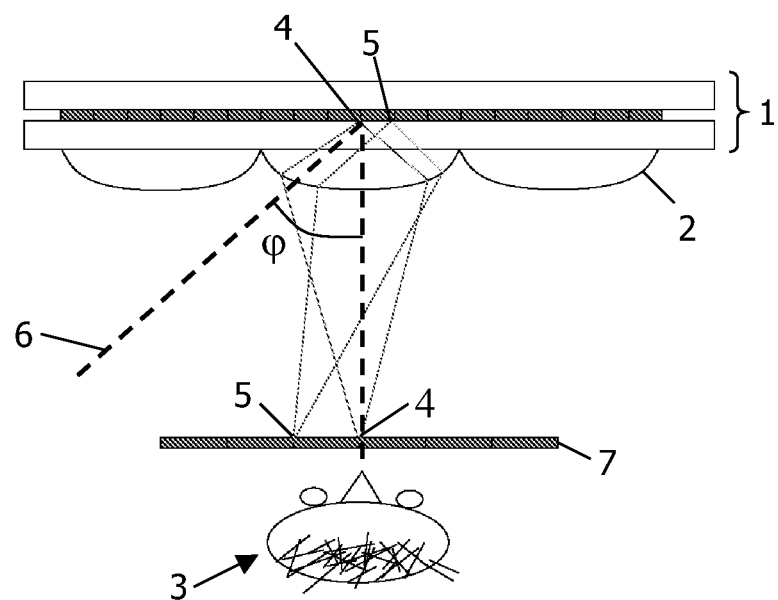

| | | | |
|---|---|---|---|
| 5,177,611 A * | 1/1993 | Gibson et al. | 348/611 |
| 5,412,423 A * | 5/1995 | Ohashi | 348/234 |
| 6,055,012 A * | 4/2000 | Haskell et al. | 348/48 |
| 6,157,402 A * | 12/2000 | Torgeson | 348/59 |
| 6,377,295 B1 * | 4/2002 | Woodgate et al. | 348/59 |
| 6,400,403 B1 * | 6/2002 | Saito | 348/273 |
| 6,445,833 B1 * | 9/2002 | Murata et al. | 382/285 |
| 6,729,546 B2 * | 5/2004 | Roustaei | 235/462.45 |
| 6,736,512 B2 * | 5/2004 | Balogh | 353/7 |
| 6,831,678 B1 * | 12/2004 | Travis | 348/46 |
| 7,324,687 B2 * | 1/2008 | Zitnick et al. | 382/154 |
| 7,486,817 B2 * | 2/2009 | Yanagawa et al. | 382/154 |
| 7,567,648 B2 * | 7/2009 | Tsubaki et al. | 378/41 |
| 7,916,934 B2 * | 3/2011 | Vetro et al. | 382/154 |
| 2001/0013933 A1 * | 8/2001 | Smith et al. | 356/454 |
| 2002/0149691 A1 * | 10/2002 | Pereira et al. | 348/335 |
| 2003/0076423 A1 * | 4/2003 | Dolgoff | 348/222.1 |
| 2003/0117489 A1 | 6/2003 | Jones et al. | |
| 2004/0001139 A1 * | 1/2004 | Kobayashi | 348/59 |
| 2005/0057807 A1 | 3/2005 | Takagi et al. | |
| 2005/0195478 A1 * | 9/2005 | Yanagawa et al. | 359/462 |
| 2006/0033732 A1 * | 2/2006 | Fukushima et al. | 345/419 |
| 2006/0132610 A1 * | 6/2006 | Xin et al. | 348/207.99 |
| 2007/0006081 A1 * | 1/2007 | Maehata et al. | 715/727 |
| 2007/0030356 A1 * | 2/2007 | Yea et al. | 348/207.99 |
| 2007/0229653 A1 * | 10/2007 | Matusik et al. | 348/51 |
| 2008/0204550 A1 * | 8/2008 | De Zwart et al. | 348/51 |
| 2009/0005961 A1 * | 1/2009 | Grabowski et al. | 701/200 |

FOREIGN PATENT DOCUMENTS

| | | |
|---|---|---|
| WO | WO0229718 A2 | 4/2002 |
| WO | WO2004039086 A2 | 5/2004 |

OTHER PUBLICATIONS

Klompenhouwer et al: "Subpixel Image Scaling for Color-Matrix Displays"; Jounral of the Society for Information Display, vol. 11, Issue 1, pp. 99-108, Mar. 2003.

Berretty et al: "Real-Time Rendering for Multiview Autostereoscopic Displays"; Proc. SPIE vol. 6055, Jan. 2006, 12 Page Document.

Moller et al: "Correcting Interperspective Aliasing in Autosteroscopic Displays"; IEEE Transactions on Visualization and Computer Graphics, vol. 11, No. 2, Mar./Apr. 2005, pp. 228-236.

* cited by examiner

RENDERING OF IMAGE DATA FOR MULTI-VIEW DISPLAY

The invention relates to a method of rendering image data for a multi-view display. In particular the invention relates to a method of rendering image data for a multi-view display on which an image may be viewed upon from a number of directions. The invention further relates to a multi-view display, to a signal rendering system and to computer readable code for implementing the method.

A multi-view display is a display capable of presenting to a viewer, different images depending upon the view-direction, so that an object in an image may be viewed from different angles. An example of a multi-view display is an auto-stereoscopic display capable of presenting a viewer's left eye with a different image than the right eye. Various multi-view display technologies exist, one such technology is lenticular based. A lenticular display is a parallax 3D display capable of showing multiple images for different horizontal viewing directions. This way, the viewer can experience, e.g. motion parallax and stereoscopic cues.

One problem relating to multi-view displays is that images for different view-directions may overlap thereby giving rise to ghost images, or cross-talk between images. Another problem relates to that the number of view-directions may be relatively small, typically eight or nine which may give rise to aliazing effects in some view-directions.

The published US patent application US 2003/0117489 discloses a three dimensional display and method of reducing crosstalk between left and right eye images of a 3D auto-stereoscopic display. The disclosed method of reducing crosstalk is based on adding a base level of grey to every pixel of both the left and right images so as to raise the background grey level.

The inventor of the present invention has appreciated that an improved method of rendering image data is of benefit, and has in consequence devised the present invention.

The present invention seeks to provide improved means for rendering image data for a multi-view display, and it may be seen as an object of the invention to provide a filtering technique that ameliorates the perceived image quality of a viewer, or user, of a multi-view display. Preferably, the invention alleviates, mitigates or eliminates one or more of the above or other disadvantages singly or in any combination.

Accordingly there is provided, in a first aspect, a method for rendering image data for a multi-view display, the method comprising the steps of:

provide view-dependent image data for an image, determine a view-dependent intensity function for the image, apply a spatial filtering to a view-dependent coordinate of the intensity function, sample the view-dependent intensity function to a plurality of sub-images, each sub-image being associated with a view-direction of the image.

In a multi-view display, the image data is typically rendered for proper presentation. The rendering may be needed since the image may be based on 2D image data projected to the viewer in such a way that the viewer perceives a spatial, or 3D, dimension of the image. For each view-direction of an image, a sub-image of the image as seen from that view-direction is generated, and the sub-images are projected into the associated view-direction.

The rendering process typically comprises several operations or steps, e.g. depending upon the input format of the image data, the display apparatus, the type of image data, etc. View-dependent image data is provided in a first step. This first step needs not be a first step of the entire rendering process. From the view-dependent image data, a view-dependent, or multi-dimensional, intensity function is determined. The view-dependent intensity function is related to the emitted light intensity, or luminance, of the display for the possible view-directions. A view-dependent coordinate of the intensity function is spatial filtered, and the spatial filtered intensity function is sampled to a plurality of sub-images. The view-dependent coordinate depends on the coordinate representation of the image data. In a typical coordinate representation, the intensity function of the image is described in terms of a spatial coordinate set referring to a position on the display screen and an angle representing the horizontal view-direction of a viewer, the angle representing the horizontal view-direction being the view-depending coordinate. It is, however, to be understood that alternative coordinate representations may be envisioned, depending on the type of multi-view display, the image data, the rendering process, etc.

The invention according to the first aspect is particularly but not exclusively advantageous for a number of reasons. In the method, the rendering process is considered as a real three-dimensional filtering process, thereby providing a direct and intuitive link between the rendering of the image data and the display apparatus on which the image is presented. This facilitates a simple and robust implementation of the method on various different display apparatuses. Furthermore, the method is effectively dealing with reduction of artefacts, such as crosstalk and aliazing artefacts, since the artefacts are dealt with in a well-defined rendering stage, making further processing unnecessary, such as making pre-processing or post-processing to further remove or diminish crosstalk or aliazing artefacts unnecessary. Moreover, the method is a very general method imposing very few, or even no, limitations on the input or output format of the image data. The view-dependent intensity function may be generated from a number of image formats, and any output image format may be generated, or sampled, based on the view-dependent intensity function.

The optional features as defined in claims 2 to 4 are advantageous since spatial filtering done by low-pass filtering, high-pass filtering and/or a combination of the two, are well-known band-pass filtering techniques which may be implemented in variety of ways, thereby ensuring robust and versatile implementation.

The optional feature as defined in claim 5 is advantageous since by applying a positive gain to frequencies above a predetermined frequency, the intensity function may be sharpened, thereby effectively dealing with crosstalk effects.

The optional feature as defined in claim 6 is advantageous since by removing the frequencies above the Nyquist frequency in the low-pass filtering, aliazing effects are effectively dealt with.

The optional features as defined in claim 7 are advantageous since by splitting the view-dependent intensity function up into color component of the image, and apply the spatial filtering to at least one color component of the image, the intensity of different color components may be dealt with separately, this may lead to a more efficient handling of the image data.

The optional features as defined in claims 8 to 10 are advantageous since they describe advantageous embodiments of how the view-dependent intensity function is generated. In claim 8, the view-dependent intensity function is generated in accordance with a configuration of an optical element, e.g. such as a lens configuration of a multi-view display. This is advantageous since the view-dependent intensity function may depend upon the optical element. In claim 9, the view-dependent intensity function is generated from an image format including color and depth information. This is advantageous, since even if a depth map is not associated with image data, such depth maps may be generated and thereby the method may be applied both to image formats including color and depth as well as to image formats including only color where the depth information is generated subsequently. In claim 10, the view-dependent intensity function is generated from a multitude of images. This is advantageous since the view-dependency of an image may be generated based on, e.g. images taken from various viewpoints.

The optional features as defined in claim 11 are advantageous since by sampling the view-dependent intensity function to an arbitrary number of view-directions, the method may be applied to displays which exhibit both fractional and integer number of view. Fractional view-numbers may e.g. advantageously be applied for view-distance correction.

The optional feature as defined in claim 12 is advantageous since the 2.5D video image format is a standard and widely used format.

According to a second aspect of the invention is provided a multi-view display device comprising:

a display panel comprising an array of display elements, the display elements being arranged in groups, each group being associated with a view-direction of an image, an optical element for directing light emitted from the display panel, so that light emitting from a group of display elements is directed into an angular distribution associated with the view-direction of the group, an input module for receiving view-dependent image data for an image, a rendering module for determining a view-dependent intensity function for the image and for applying a spatial filtering to a view-dependent coordinate of the intensity function, an output module for outputting the view-dependent intensity function to a plurality of sub-images, each sub-image being associated with a group of display elements and a view-direction of the image.

The display device being a multi-view display device enhanced with the rendering method of the first aspect. It is an advantage of the present invention that the multi-view display device may both be a display device born with the functionality according to the first aspect of the invention, or a display device not born with the functionality according to the first aspect of the invention, but which subsequently is enhanced with the functionality of the present invention.

The input module, the rendering module and the output module may be provided as a signal rendering system according to the third aspect of the invention.

According to a fourth aspect of the invention is provided a computer readable code for implementing the method of according to the first aspect.

In general the various aspects of the invention may be combined and coupled in any way possible within the scope of the invention. These and other aspects, features and/or advantages of the invention will be apparent from and elucidated with reference to the embodiments described hereinafter.

Figures 2A, 2B:
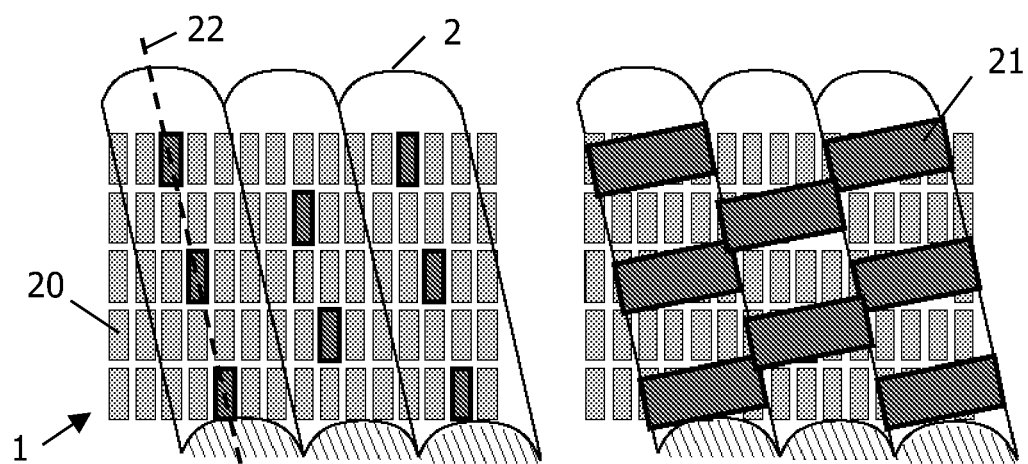
Figure 3:
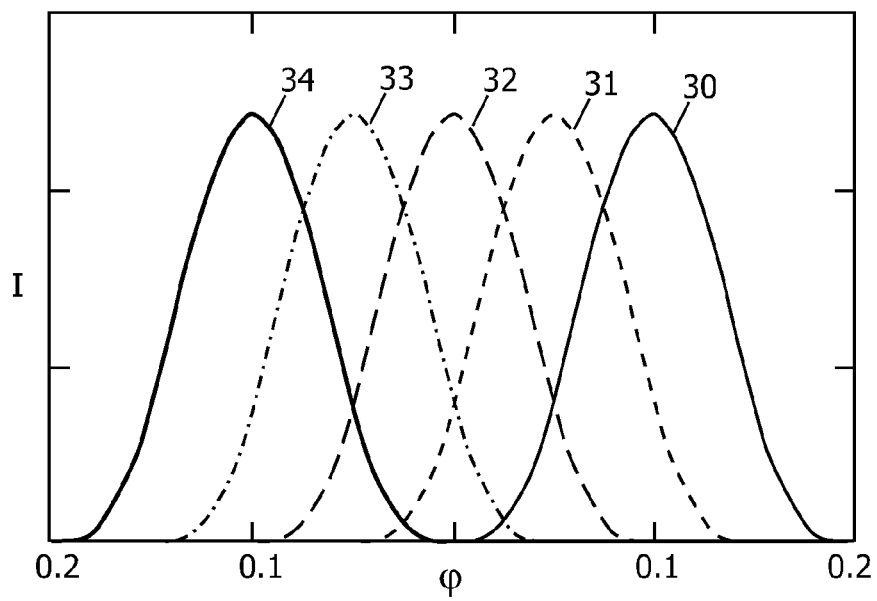
Figure 4A:
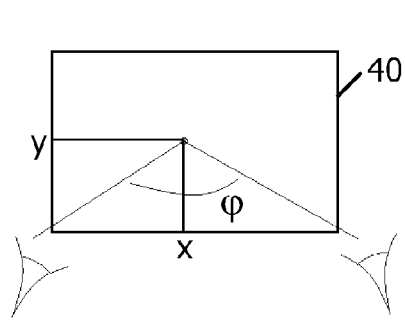
Figure 4B:
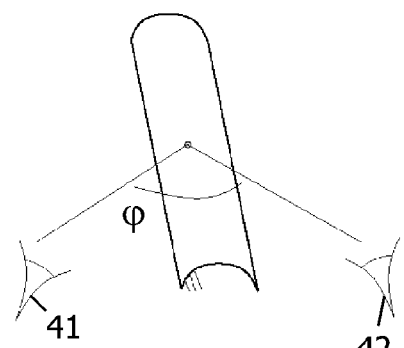
Figure 5A:
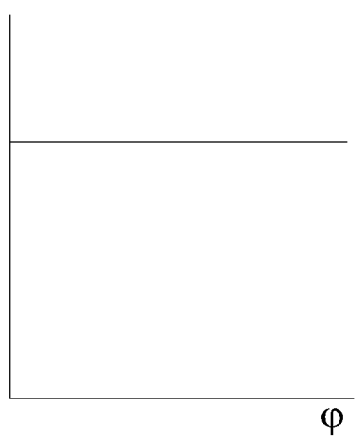
Figure 5B:
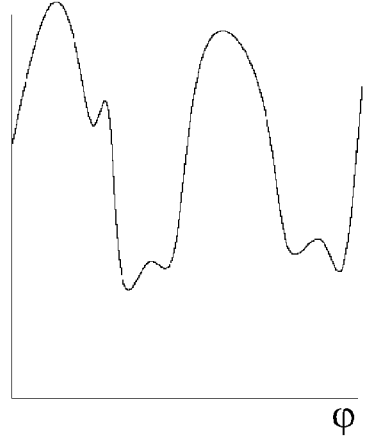
Figure 6:
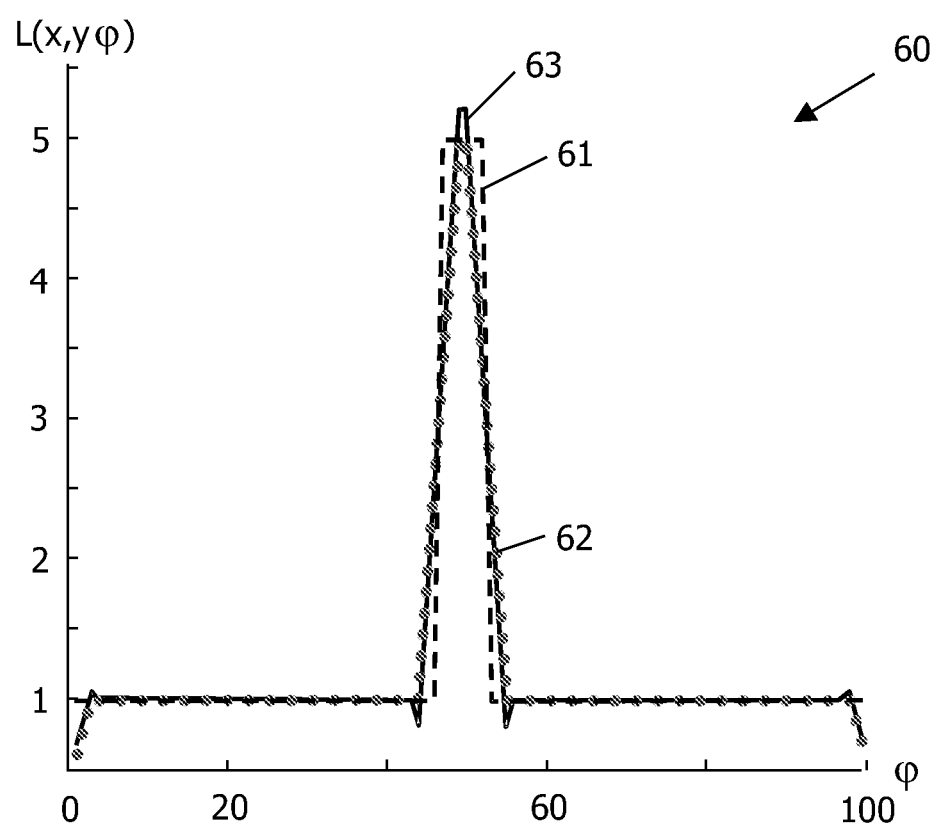
Figure 7:
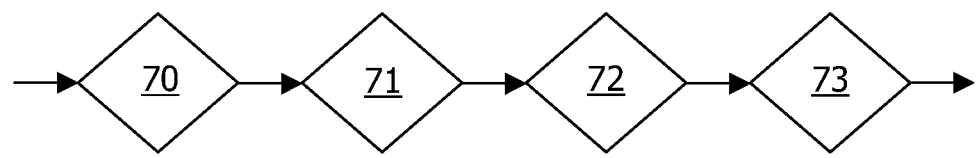

Embodiments of the invention will be described, by way of example only, with reference to the drawings, in which FIG. 1 illustrates the principle of a 3D lenticular display, FIGS. 2A and 2B show a sketch of a lenticular display in top view, FIG. 3 illustrates crosstalk between sub-images from neighboring views, FIGS. 4A and 4B illustrate a viewer observing a fixed point from various angles for a 2D display and a 3D lenticular display, FIGS. 5A and 5B illustrate examples of a view-dependent intensity function, FIG. 6 illustrates the effect of band-pass filtering of an intensity function, FIG. 7 shows a flow chart of an embodiment of the present invention.

FIG. 1 illustrates the principle of a 3D lenticular display. A lenticular display is based on an LCD panel display 1, in front of which lenses 2 are attached. The lenses accommodate that for a specific viewing angle $\phi$, the viewer 3 only sees a subset of the pixels of the underlying LCD. If appropriate values are set to the subset of pixels associated to the various viewing directions, the viewer will see different images from different viewing directions. So that the viewer 3 sees a center view of the image, whereas the viewer would see a side view of the image from the view-angle denoted 6.

Each lens covers a number of pixels 4, 5 and projects them out, as illustrated by the number of pixels denoted 7. The viewer sees one subset of pixels 4 with the right eye and another subset of pixels 5 with the left eye. A 3D experience is thereby obtained.

FIG. 2A shows a sketch of lenticular display in top view. The display comprises an array of display elements 20 or pixels, such as a conventional LC matrix display panel, where the pixels are arranged in groups, each group being associated with a view-direction of an image. Each group of pixel constitutes a sub-image, each sub-image being associated with a view-direction. An optical element, i.e. the lenses, direct light emitted from the pixels, so that light emitting from a group of pixels is directed into an angular distribution associated with the view-direction of the group, thereby providing separate images to a viewer's eyes.

The lenticular lenses are in the illustrated embodiment arranged at a slight angle or slanted with respect to the columns of the pixels, so that their main longitudinal axis is at an angle with respect to the column direction of the display elements. In this configuration the viewer will see the points sampled along a direction 22 of the lens. In a nine-view display, nine images, one for each view-direction, are concurrently computed and shown on the group of pixels associated with a sub-image. When a pixel is lit, the entire lens above the pixel is illuminated 21—this is shown in FIG. 2B—so that for a specific view-direction it is the entire lens above the pixel that is seen.

FIGS. 1, 2A and 2B describe a LCD-lenticular display, it is however to be understood that the invention is not limited to this type of display. For example may the invention be applied with such displays as barrier-type displays, and the matrix display panel may be other than an LC panel, such as other forms of spatial light modulators, or other types of display panels such as electroluminescent or plasma panels.

The visibility of sub-images from neighboring views from a single viewing direction may cause artefacts such as crosstalk. This is illustrated in FIG. 3 showing the visible light, I, as a function of the view angle for a 4⅔-display, i.e. for a display where each lens cover 4⅔ pixel in the horizontal direction. It is seen that the angular distributions 30-34 from different sub-images overlap. The perceived image of a viewer is the sum of the light from each angular distribution and it may be seen that for this particular example, three sub-images contributes to the perceived image of each viewing direction.

The inventor of the present invention has appreciated that by appropriate filtering problems relating to crosstalk, to ghost imaging and aliazing may be removed or at least diminished.

These problems are addressed by considering the rendering for 3D displays as a real three-dimensional filtering process. For each position (x, y) on the display 40 and a viewing angle φ, an intensity, or luminance, function, L(x, y, φ) is given, the intensity function describing the intensity of, or luminance emission from, the display.

FIG. 4A illustrates the situation of a normal 2D display, where the user observes the same image from all directions. On an ideal 3D display (FIG. 4B), the viewer observes different images from different view-directions. That is, different images are seen from the two view-directions 41, 42.

That a viewer observes different images from different view-directions is reflected in the intensity function. The intensity function related to a 2D display is constant for various viewing angles φ (FIG. 5A), whereas the intensity function related to a 3D display is a function of the viewing angle φ, an example of this is given in FIG. 5B.

FIG. 6 illustrates the effect of band-pass filtering of the intensity function. After the filtering, the view-dependent intensity function is sampled to a plurality of sub-images. The resulting pixel values are assigned to the display so that the sub-images are formed on the display.

FIG. 6 illustrates a graph 60 of the intensity as a function of view angle. The broken curve denoted 61 shows the original intensity function. The dotted line denoted 62 shows the function after a low-pass filter has been applied, and the continuous line denoted 63 shows the function after a high-pass filter has been applied. In this example, the low-pass filter is first applied and subsequently is the high-pass filter applied. The resulting intensity function sampled to the sub-images is in this example the function 63 after applying both band-pass filters.

The low-pass filter mitigates problems, typically alias problems, related to sampling the intensity function into a low number of sub-images, such as eight or nine, depending upon the number of views of the display. In the low-pass filtering, frequencies higher than the Nyquist frequency may be removed. The high-pass filter mitigates problems relating to crosstalk imposing blur in the view-direction. The high-pass filter amplifies high frequencies, e.g. the frequencies below the Nyquist frequency, by boosting these frequencies, i.e. by applying a positive gain to the frequencies above a predetermined frequency. A combination of high-pass filtering and low-pass filtering is illustrated in FIG. 6, however the filters may also be applied separately, so that only a high-pass filter is applied or only a low-pass filter is applied. For embodiments where a combination of high-pass and low-pass filtering is applied, the filtering order may be different from the order of FIG. 6. The band-pass filtering may be done by means of Fourier transformation of the view-dependent coordinate, i.e. φ, or by other suitable transformations.

In an embodiment, the signal including the image data to be presented to the viewer is inputted into an input module. The view-dependent intensity function is reconstructed, or determined, from the inputted image data at a rendering module, the rendering module typically being a processor unit. The view-dependent intensity function may be reconstructed, or generated, in accordance with a configuration of the optical element, e.g. by taking into account the number of lenses, the type or geometry of the lenses, the positions of the lenses, etc. The view-dependent intensity function may also be reconstructed from an input signal including color and depth information of the images such as the 2.5D video format. The view-dependent intensity function may also be reconstructed from any number of views, such as a multitude of images, describing the image from a multitude of view-directions. The spatial filtering of the view-dependent coordinate is also applied at the rendering module, and the filtered intensity function is outputted at an output module to a plurality of sub-images, each sub-image being associated with a group of display elements and a view-direction of the image. The input module, rendering module and output module, need not, but may, be separate entities.

The rendering module may also apply additional rendering functions to the image data, e.g. the image data may be properly scaled to the view resolution, colors may be adjusted, etc. The rendering of the image signal may be done separately for different color components and the view-dependent intensity function may be determined for at least one color component of the image, and the spatial filtering applied to the at least one color component of the image. For example, since in an RGB-signal the green component is the most luminous component, the spatial filtering may in an embodiment only be applied for the green component.

The view-dependent intensity function may be sampled to an arbitrary number of view-directions, thereby rendering the view-dependent intensity function applicable for displays for which the pixels are not associated with an integer view number, e.g. a 4.4999 view system. In this situation, for each pixel of the display, a non-integer view-number is computed and the view-dependent intensity function is sampled at the position of the pixel. Sampling of the intensity function to a non-integer display may be applied for view-distance correction. Normally multi-view displays are optimized for a certain view-distance. If a certain pixel is seen from a first view-distance, and if the same image should be seen from a second view-distance, a different pixel should be assigned with the pixel value. As the view-point moves closer to or away from the screen, the view number assigned to a pixel shift. However, this is only a small correction and fractional view numbers result. In an embodiment can the correction be accounted for by adjusting the value used for the lens width. Since as the viewpoint moves closer, a lens seems to slightly cover more pixels, and vice-versa for a viewpoint moving away.

In an embodiment, two stages are used to perform the rendering. In the first stage, several intermediate views are rendered using proper pre-filtering in the spatial domain, the pre-filtering ensuring that the intermediate views are generated at the proper intermediate resolution, that artefacts, such as aliazing, are not introduced by the rendering process, etc. For each output line, this results for each of the lenses to a number of RGB-colors corresponding to each of the views that were computed.

In the second stage, the continuous signal in the view dimension is reconstructed from the view samples, i.e. the intensity function is reconstructed, and re-sampled to the required output views for that spatial location using the proper spatially filtered function, i.e. the function corresponding to the intensity curve denoted 63 in FIG. 6. This can be done by a 1D reconstruction of the view signal for one spatial position. Alternatively, for displays like the 4½ (nine view) and the 4⅔ (7 or 14 view) displays where more than one view are visible from a given direction (from neighboring lenses), it is also possible to take the samples from neighboring lenses into account and perform a 2D filtering.

This two-stage approach is very general: the number of views generated in the first stage may be parameterized, even for a different number than the number of views required for the output. If several images are already available (shot with multiple cameras for example, or generated using CGI), the second stage can be used to interleave these images, and in this way for example nine images shot for a nine-view display can be rendered for a 14 (4⅔) display.

Due to the generality of the approach, colors may be computed in the first stage that are never needed in the second stage: for an optimally efficient implementation for a specific display type, the algorithm can be specialized.

FIG. 7 illustrates a flow chart of an embodiment of the present invention. In a first step 70 is view-dependent image data for an image provided, e.g. at an input module, the view-dependent intensity function for the image in next generated or provided from the input data 71. A spatial filtering is subsequently applied 72, e.g. in a rendering module, to a view-dependent coordinate of the intensity function, and the view-dependent intensity function is sampled 73 to a plurality of sub-images, each sub-image being associated with a view-direction of the image. The sampling may be done at an output module.

Some of the features indicated in the drawings are typically implemented in software, and as such represent software entities, such as software modules or objects.

The invention can be implemented in any suitable form including hardware, software, firmware or any combination of these. The invention can be implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

Reference signs are included in the claims, however the inclusion of the reference signs is only for clarity reasons and should not be construed as limiting the scope of the claims.

The invention claimed is:

1. Method for rendering image data for a multi-view display, the method comprising the steps of:
providing, via an input, view-dependent image data for an image;
determining, via a processor, a view-dependent intensity function $L(x, y, \phi)$ for the image from the view-dependent image data, for (i) each position (x,y) on the multi-view display and (ii) a viewing angle ($\phi$), wherein the view-dependent intensity function describes an intensity of emission from the multi-view display as a function of the viewing angle ($\phi$) for each position (x,y) of the multiview display, and further wherein the viewing angle ($\phi$) comprises a view-dependent coordinate that represents a horizontal view direction of a viewer with respect to a centerline of the display panel;
applying spatial filtering, via a spatial filter, to the view-dependent intensity function as a function of the viewing angle ($\phi$) to provide a spatial filtered view-dependent intensity function; and
sampling, via an output, after the spatial filtering, the spatial filtered view-dependent intensity function to a plurality of sub-images, each sub-image being associated with a view-direction of the image at a position of a group of pixels on the multi-view display, wherein light emitted from each group of pixels is directed into an angular distribution associated with the view direction of the respective group of pixels and provides separate images to the viewer's eyes.

2. Method according to claim 1, wherein the spatial filter is a high-pass filter.

3. Method according to claim 1, wherein the spatial filter is a low-pass filter.

4. Method according to claim 1, wherein the spatial filter is a combination of a high-pass filter and a low-pass filter.

5. Method according to claim 2, wherein the high-pass filter applies positive gain to frequencies above a predetermined frequency.

6. Method according to claim 3, wherein frequencies above the Nyquist frequency are removed in the low-pass filtering.

7. Method according to claim 1, wherein the view-dependent intensity function is determined for at least one color component of the image, and wherein the spatial filtering is applied to the at least one color component of the image.

8. Method according to claim 1, wherein the view-dependent intensity function is generated in accordance with a configuration of an optical element.

9. Method according to claim 1, wherein the view-dependent intensity function is generated from an image format including color and depth information.

10. Method according to claim 1, wherein the view-dependent intensity function is generated from a multitude of images.

11. Method according to claim 1, wherein the view-dependent intensity function is sampled to an arbitrary number of view-directions.

12. Method according to claim 1, wherein an image format of the image data is a 2.5D video image format.

13. Multi-view display device comprising:
a display panel including an array of display elements, the display elements being arranged in groups, each group being associated with a view-direction of an image;
an optical element for directing light emitted from the display panel, so that light emitting from a group of display elements is directed into an angular distribution associated with the view-direction of the group;
an input module for receiving view-dependent image data for an image;

a rendering module for determining a view-dependent intensity function L(x, y, φ) for the image from the view-dependent image data, for (i) each position (x,y) on the display panel and (ii) a viewing angle (φ), wherein the view-dependent intensity function describes an intensity of emission from the display panel as a function of the viewing angle (φ) and for applying a spatial filtering to a view-dependent coordinate of the view-dependent intensity function as a function of the viewing angle (φ) to provide a spatial filtered view-dependent intensity function for each position (x,y) of the multiview display device, and further wherein the viewing angle (φ) comprises a view-dependent coordinate that represents a horizontal view direction of a viewer with respect to a centerline of the display panel; and an output module for outputting the spatial filtered view-dependent intensity function to a plurality of sub-images, each sub-image being associated with a group of display elements and a view-direction of the image at a position of a group of pixels on the display panel, wherein light emitted from each group of pixels is directed into an angular distribution associated with the view direction of the respective group of pixels and provides separate images to the viewer's eyes.

14. Signal rendering system comprising:

an input module for receiving view-dependent image data for an image;

a rendering module for determining a view-dependent intensity function L(x, y, φ) for the image from the view-dependent image data, for (i) each position (x,y) on a display panel and (ii) a viewing angle (φ), wherein the view-dependent intensity function describes an intensity of emission from the display panel as a function of the viewing angle (φ) for each position (x,y) of the display panel, and further wherein the viewing angle (φ) comprises a view-dependent coordinate represents a horizontal view direction of a viewer with respect to a centerline of the display panel, and for applying a spatial filtering to the view-dependent coordinate of the view-dependent intensity function as a function of the viewing angle (φ) to provide a spatial filtered view-dependent intensity function; and an output module for outputting the spatial filtered view-dependent intensity function to a plurality of sub-images, each sub-image being associated with a group of display elements and a view-direction of the image at a position of a group of pixels on the display panel, wherein light emitted from each group of pixels is directed into an angular distribution associated with the view direction of the respective group of pixels and provides separate images to the viewer's eyes, and wherein the input module, the rendering module and the output module comprise non-transient entities implemented in hardware, software, firmware or any combination of these.

15. A non-transient computer readable medium encoded with computer program code executable by a processor for implementing the method of claim 1.

* * * * *